United States Patent
Steele et al.

(10) Patent No.: US 7,695,312 B2
(45) Date of Patent: Apr. 13, 2010

(54) CORD WRAP AND POWER PLUG RECEPTACLE ARRANGEMENT FOR INFLATOR

(75) Inventors: Kimberly Ann Steele, Northville, MI (US); Darryl L. Jones, Southfield, MI (US); Yinchao Guan, Jiangsu (CN)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/179,982

(22) Filed: Jul. 25, 2008

(65) Prior Publication Data

US 2009/0053924 A1 Feb. 26, 2009

Related U.S. Application Data

(60) Provisional application No. 60/965,594, filed on Aug. 20, 2007.

(51) Int. Cl.
*H01R 13/72* (2006.01)
(52) U.S. Cl. ............. 439/501; 439/528; 141/38
(58) Field of Classification Search .......... 439/501, 439/528; 141/38
See application file for complete search history.

(56) References Cited

U.S. PATENT DOCUMENTS

| D286,782 | S | * | 11/1986 | Somers ................... D15/7 |
| 4,658,465 | A | | 4/1987 | Keane et al. |
| 4,756,697 | A | | 7/1988 | Hefling |
| D301,887 | S | * | 6/1989 | Price et al. ............... D15/7 |
| 6,283,172 | B1 | * | 9/2001 | Thurner ................... 141/38 |
| 6,301,901 | B1 | | 10/2001 | Coffee et al. |
| 6,428,348 | B1 | * | 8/2002 | Bean ....................... 439/501 |
| 6,964,284 | B2 | * | 11/2005 | Eckhardt ................. 141/38 |
| 2005/0284980 | A1 | | 12/2005 | Chang |
| 2007/0113369 | A1 | | 5/2007 | Cochran et al. |

* cited by examiner

*Primary Examiner*—Tho D Ta
(74) *Attorney, Agent, or Firm*—O'Brien Jones, PLLC

(57) ABSTRACT

A temporary mobility kit to minimize or prevent the inadvertent outflow of tire sealant is provided. The temporary mobility kit includes a switch-inflator assembly and a removable sealant assembly. The switch-inflator assembly includes a pump motor and an electrical plug assembly having a cord portion and a plug. The plug is adapted for use in the vehicle's power unit. The housing includes a peripheral channel about which the cord portion of the electrical plug assembly is wrapped when the electrical plug assembly is not in use. A plug-receiving aperture is provided to receive and retain the plug when not in use.

17 Claims, 2 Drawing Sheets

CORD WRAP AND POWER PLUG RECEPTACLE ARRANGEMENT FOR INFLATOR

TECHNICAL FIELD

The present invention relates generally to portable inflator units for vehicle tires. More particularly, the present invention relates to a cord wrap and power plug receptacle arrangement for a portable inflator unit for inflating a vehicle tire.

BACKGROUND OF THE INVENTION

Automotive manufacturers have traditionally offered spare tires with the fleet of vehicles they produce. In the early days of automobiles the spare tire was mounted externally on either the running board or on a rear-mounted tire carrier. To comply with advances in styling the spare tire was concealed, most typically being moved inside the vehicle's trunk. While this arrangement provided a suitable solution for placement of the spare tire for decades, the demand for increased space for luggage and the like coupled with changes in fuel economy requirements dictating the need for vehicle weight reduction forced manufacturers to consider the vehicle anew in its entirety as they sought ways to increase trunk space and reduce vehicle weight. One answer to the effort to reduce overall vehicle weight was to replace the conventional, large and bulky road tire with a smaller temporary tire or "donut."

While the temporary tire represented a significant increase in trunk space as well as a decrease in overall vehicle weight, the further improvement in tire design and durability as well as the concurrent general improvement in roadways has gradually begun to reduce the need for relying on a spare tire at all. Today the on-the-road emergency changing of a tire is a relatively rare event. It is now very possible for a spare tire to last the life of the vehicle without ever being replaced, although this is certainly not the preferred practice.

In response to these advances in both tire technology and road quality, vehicle auto manufacturers have begun to substitute a "temporary mobility kit" (or "TMK") for the spare tire. The TMK includes a dual-purpose air compressor and a sealing system. The sealing system includes a sealing compound that will effectively seal most punctures caused by nails or similar objects. The air compressor drives the sealing compound into the compromised tire and, subsequently, can be used to reinflate the tire once the sealing compound has been introduced into the tire and the leak has been sealed. The growing trend today is for manufacturers to equip the vehicle with a temporary mobility kit in lieu of the spare tire, often locating the TMK in the spare tire well in the trunk.

One of the difficulties of known temporary mobility kits is the inconvenience and impracticality of arrangements for storing the cord and for maintaining the plug in a convenient place when the unit is not in use. Today it is known to provide a space in which both the cord and the power plug can be inserted or a space for the power plug alone. Typically these spaces are very small and work well only when the temporary mobility kit is new from the factory and has not yet been used. Once the TMK has been used, it is challenging for the average user to refit the cord and the plug into the small space.

While providing clear advantages over the weight demands of the spare tire as well as providing the vehicle operator with a practical alternative over the demands of tire changing, as in most every area of vehicle technology temporary mobility kits are in a continuing state of development.

SUMMARY OF THE INVENTION

The present invention provides a temporary mobility kit having a convenient and practical way of readily storing both the power cord and the power plug between uses. The temporary mobility kit disclosed herein includes a switch-inflator assembly and an interchangeable sealant assembly. The interchangeable sealant assembly includes a canister which can be replaced once used. The switch-inflator assembly has an housing. The power plug is attached to the power cord and the power cored is attached to the switch-inflator assembly. A peripheral power cord-accommodating channel and a power plug-accommodating hole are formed in the upper portion of the housing of the switch-inflator assembly. The power cord is stored in the power cord-accommodating channel and the power plug is stored in the power plug-accommodating hole during periods of non-use.

To use the power cord and the associated power plug of the temporary mobility kit the power plug is withdrawn from the plug-accommodating hole and the cord is removed from cord-accommodating channel by unwrapping. After use of the temporary mobility kit the user can readily wrap the cord into the cord-accommodating channel followed by the insertion of the power plug into the plug-accommodating hole. With the power plug fitted to the plug-accommodating hole an amount of tension is applied to the power cord such that the power cord is retained in the cord-accommodating channel without becoming loose.

Other features of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiment illustrated in greater detail in the accompanying drawings and described below by way of examples of the invention wherein.

DETAILED DESCRIPTION OF THE PREFERRED EMBODIMENT

Figure 1:
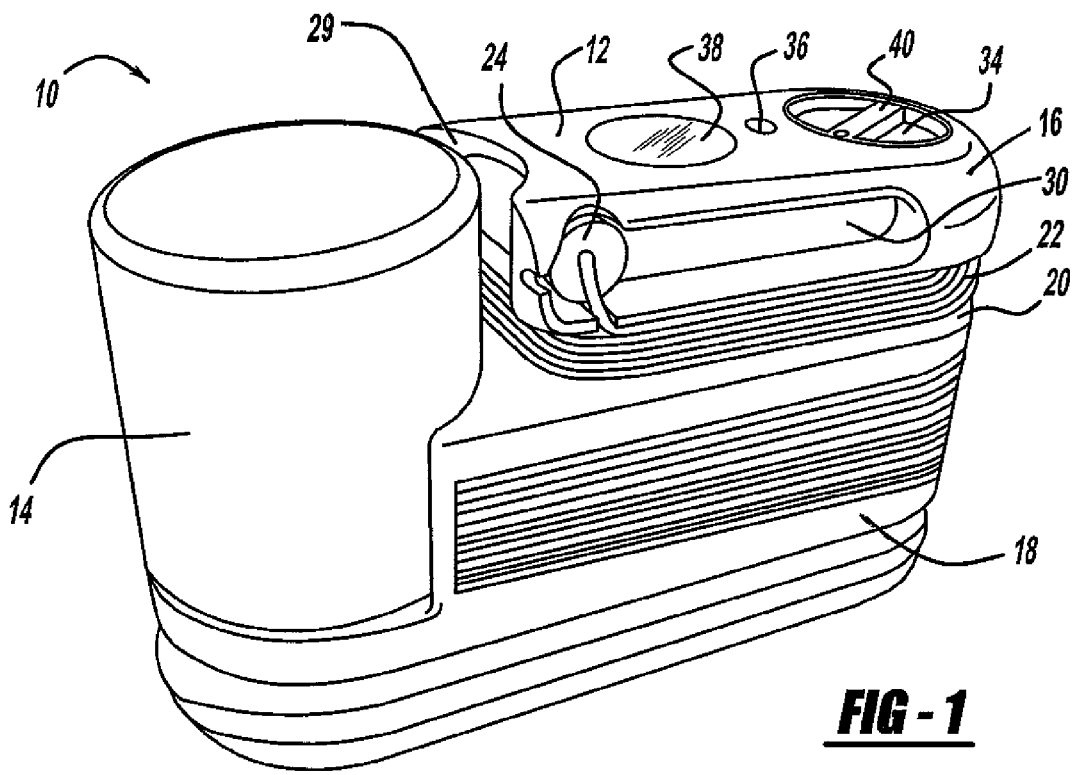
FIG. 1 illustrates a perspective view of the temporary mobility kit of the disclosed invention showing the power cord and the power plug in their stored conditions.

In the following figures, the same reference numerals will be used to refer to the same components. In the following description, various operating parameters and components are described for one constructed embodiment. These specific parameters and components are included as examples and are not meant to be limiting.

Figure 2:
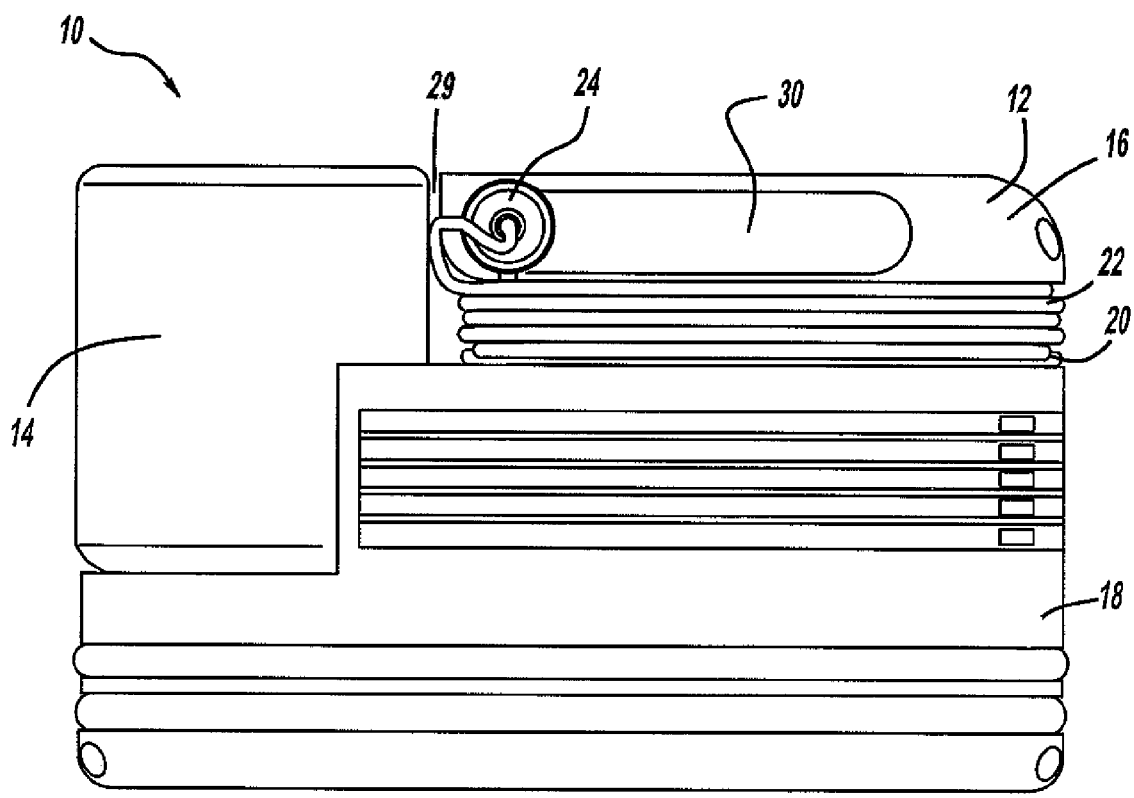
FIG. 2 is a side view of the temporary mobility kit of FIG. 1 also showing the power cord and the power plug in their stored conditions.

Referring to the drawings and in particular to FIGS. 1 and 2, a perspective view and a side view of a temporary mobility kit, generally illustrated as 10, are respectively shown. The temporary mobility kit 10 includes a switch-inflator assembly 12 and a sealant assembly 14. While preferably being a one-piece part, the switch-inflator assembly 12 includes an upper portion 16 and a lower portion 18.

The temporary mobility kit 10 includes an electrical plug assembly 20 having a cord portion 22 and a plug 24. The plug 24 is adapted for use in the vehicle's power unit (not shown). Formed between the upper portion 16 and the lower portion 18 is a peripheral channel 26 about which the cord portion 22 of the electrical plug assembly 24 is wrapped when the electrical plug assembly 24 is not in use. A plug-receiving aperture 28 is provided to receive and retain the plug 24 when the temporary mobility kit 10 is not in use. The peripheral channel 26 and the plug-receiving aperture 28 are more clearly seen in FIG. 3. The plug-receiving aperture 28 is shown in partial broken lines in FIG. 4 in which it is clearly seen that the aperture 28 for the plug 26 is defined in the housing in a transverse, cross-wise manner. Other arrangements for the aperture 28 are possible, and the illustrated transverse arrangement is suggested and is not intended to be limiting.

Figure 3:
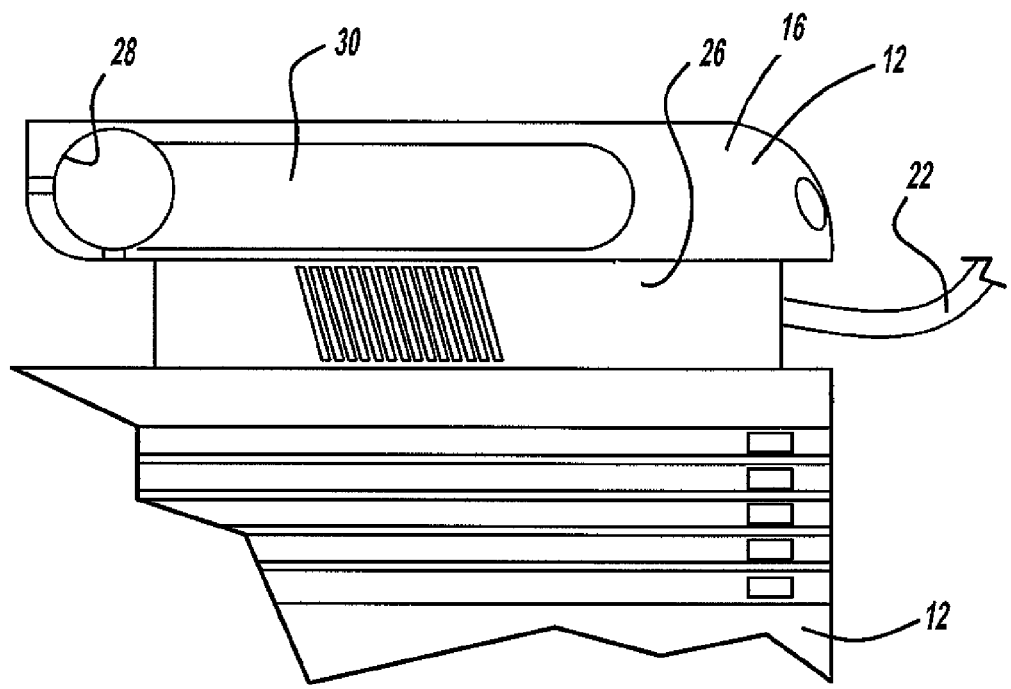
FIG. 3 is a close-up view of the upper portion of the switch-inflator assembly in which the peripheral cord-accommodating channel and the plug-accommodating hole of the temporary mobility kit are illustrated.

As illustrated in FIGS. 1, 2 and 3, a gap 29 is defined between the upper portion 16 and the sealant assembly 14. The gap 29 allows the cord portion 22 to be wrapped in the peripheral channel 26.

Figure 4:
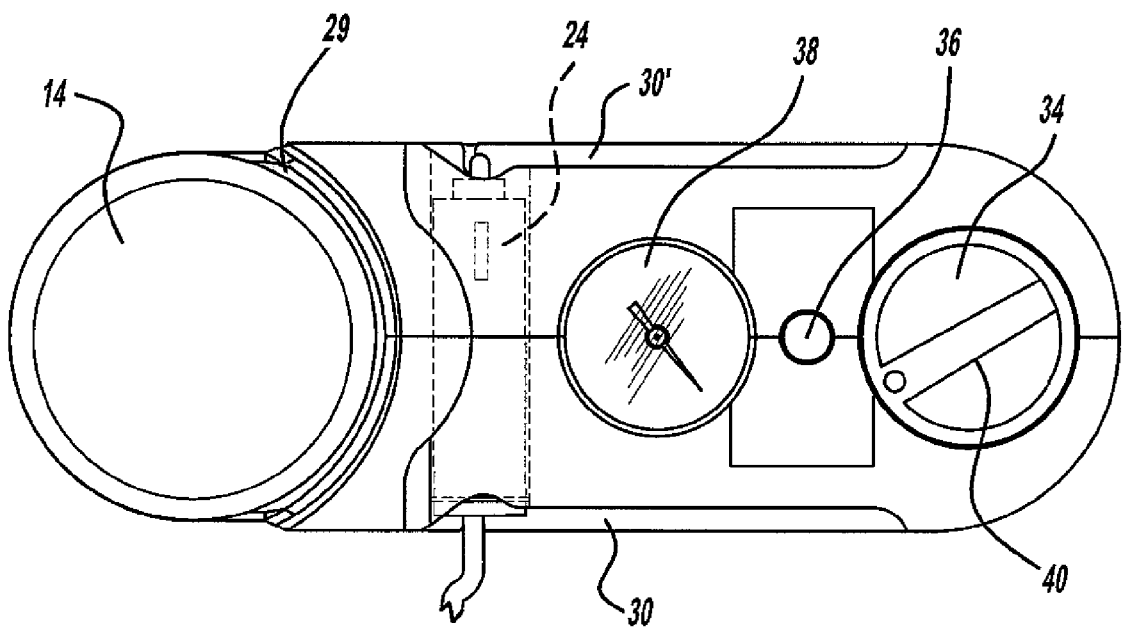
FIG. 4 is a top view of the temporary mobility kit illustrating particularly the plug-accommodating hole shown in broken lines.

A pair of opposed recessed areas defined by a first recessed area 30 and a second recessed area 30' is defined on the opposite sides of the upper area 16 of the switch-inflator assembly 12. The opposed recessed areas 30 and 30' are provided to allow for the user to readily grasp and lift the temporary mobility kit 10. As illustrated in FIG. 4, the plug-receiving aperture 24 is preferably continuous between the first recessed area 30 and the second recessed area 30'.

The switch-inflator assembly 12 also includes a diverter switch 34, a power-on, power-off button 36, and an air pressure gauge 38. The power-on, power-off button 36 may be of a variety of types but is preferably a momentary switch. Placement of these components as set forth is only suggestive and is not to be taken as being limiting. However, with each of these components being positioned on the top of the switch-inflator assembly 12 they are within easy reach of the user and also provide an easy view of the operating condition of the temporary mobility kit 10 in its relation to the tire.

The diverter switch 34 includes a knob 40. The diverter switch 34 may also be characterized as a function switch. The diverter switch 34 provides the temporary mobility kit 10 with a way of allowing the user to select between the sealant function and the air inflation function. The selection arrangement presented herein allows only one function to be enabled at a time. The knob 40 may be rotated between an air inflation position and a sealant function position.

The power-on, power-off button 36 operates to engage or disengage the temporary mobility kit 10. The air pressure gauge 38 provides the user with information as to the amount of air pressure in the subject tire in real time.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A portable apparatus for sealing and inflating a pneumatic article, the apparatus comprising:
    a switch-inflator assembly having an upper portion, a lower portion, and a peripheral channel defined between said upper portion and said lower portion, the upper portion including a pair of opposed, handle-defining recessed regions;
    a sealant portion releasably attached to said switch-inflator assembly, said sealant portion being spaced apart from said upper portion of said switch-inflator assembly whereby a cord-passing gap is defined between said sealant portion and said upper portion of said switch-inflator assembly; and
    a cord and plug assembly connected to said switch-inflator assembly,
    whereby said cord is removably positionable within said peripheral channel.

2. The portable apparatus for sealing and inflating of claim 1 further including a plug-receiving hole formed in said switch-inflator assembly.

3. The portable apparatus for sealing and inflating of claim 2, wherein said plug-receiving hole is formed between said pair of opposed, handle-defining recessed regions.

4. The portable apparatus for sealing and inflating of claim 3, wherein said sealant portion is a canister.

5. A temporary mobility kit for use in sealing and filling a pneumatic article, the temporary mobility kit comprising:
    a switch-inflator assembly, said switch-inflator assembly including a housing, an air inflator pump, and an electrical cord assembly, said electrical cord assembly having a cord and a plug, said housing having a peripheral channel defined therein for accommodating said cord, said housing further having a recess formed therein for accommodating said plug and an upper portion and lower portion, the upper portion including a pair of opposed, handle-defining recessed regions.

6. The temporary mobility kit of claim 5, wherein said peripheral channel is formed between said upper portion and said lower portion.

7. The temporary mobility kit of claim 5, further including a sealant portion removably attached to said switch-inflator assembly, said sealant portion being spaced apart from said upper portion of said housing whereby a cord-passing gap is defined between said sealant portion and said upper portion of said housing.

8. The temporary mobility kit of claim 5, wherein said recess for accommodating said plug is formed between said pair of opposed, handle-defining recessed regions.

9. The temporary mobility kit of claim 8, further including a sealant portion removably attached to said switch-inflator assembly.

10. The temporary mobility kit of claim 9, wherein said sealant portion is spaced apart from said upper portion of said housing whereby a cord-passing space is defined between said sealant portion and said upper portion of said housing.

11. The temporary mobility kit of claim 10, wherein said sealant portion is a canister.

12. A portable apparatus for sealing and inflating a pneumatic article, the apparatus comprising:
    a switch-inflator assembly having an upper portion, a lower portion, and a peripheral channel defined between said upper portion and said lower portion, the upper portion including a pair of opposed, handle-defining recessed regions;
    a sealant portion releasably attached to said switch-inflator assembly; and a cord and plug assembly connected to said switch-inflator assembly, whereby said cord is removably positionable within said peripheral channel.

13. The portable apparatus for sealing and inflating of claim 12 wherein said sealant portion is spaced apart from said upper portion of said housing whereby a cord-passing gap is defined between said sealant portion and said upper portion of said housing.

14. The portable apparatus for sealing and inflating of claim 12 further including a plug-receiving recess formed in said switch-inflator assembly.

15. The portable apparatus for sealing and inflating of claim 14, wherein said plug-receiving recess is formed between said pair of opposed, handle-defining recessed regions.

16. The portable apparatus for sealing and inflating of claim 15 wherein said sealant portion is spaced apart from said upper portion of said housing whereby a cord-passing gap is defined between said sealant portion and said upper portion of said housing.

17. The portable apparatus for sealing and inflating of claim 16, wherein said sealant portion is a canister.

* * * * *

US007695312C1

(12) INTER PARTES REEXAMINATION CERTIFICATE (738th)
United States Patent
Steele et al.

(10) Number: US 7,695,312 C1
(45) Certificate Issued: Nov. 13, 2013

(54) CORD WRAP AND POWER PLUG RECEPTACLE ARRANGEMENT FOR INFLATOR

(75) Inventors: Kimberly Ann Steele, Northville, MI (US); Darryl L. Jones, Southfield, MI (US); Yinchao Guan, Jiangsu (CN)

(73) Assignee: Ford Global Technologies, LLC, Dearborn, MI (US)

Reexamination Request:
No. 95/000,581, Dec. 9, 2010

Reexamination Certificate for:
Patent No.: 7,695,312
Issued: Apr. 13, 2010
Appl. No.: 12/179,982
Filed: Jul. 25, 2008

Related U.S. Application Data

(60) Provisional application No. 60/965,594, filed on Aug. 20, 2007.

(51) Int. Cl.
*H01R 13/72* (2006.01)

(52) U.S. Cl.
USPC .............................. 439/501; 141/38; 439/528

(58) Field of Classification Search
None
See application file for complete search history.

(56) References Cited

To view the complete listing of prior art documents cited during the proceeding for Reexamination Control Number 95/000,581, please refer to the USPTO's public Patent Application Information Retrieval (PAIR) system under the Display References tab.

*Primary Examiner* — Margaret Rubin

(57) ABSTRACT

A temporary mobility kit to minimize or prevent the inadvertent outflow of tire sealant is provided. The temporary mobility kit includes a switch-inflator assembly and a removable sealant assembly. The switch-inflator assembly includes a pump motor and an electrical plug assembly having a cord portion and a plug. The plug is adapted for use in the vehicle's power unit. The housing includes a peripheral channel about which the cord portion of the electrical plug assembly is wrapped when the electrical plug assembly is not in use. A plug-receiving aperture is provided to receive and retain the plug when not in use.

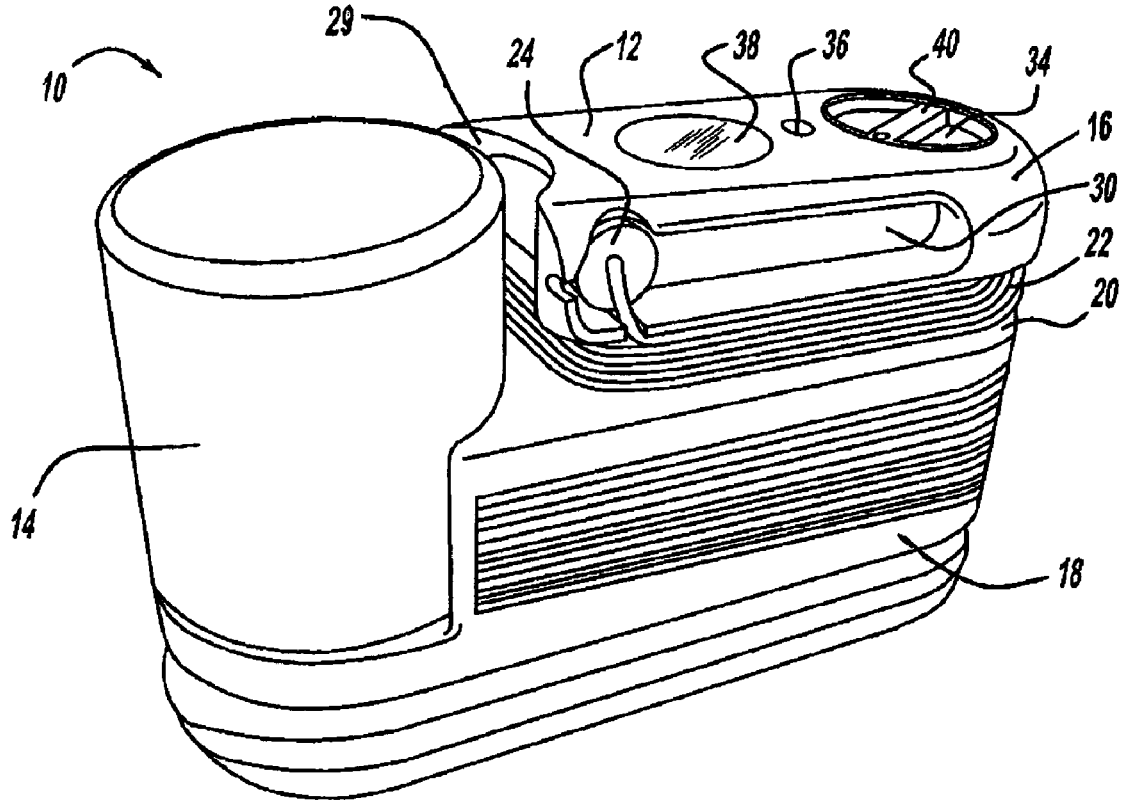

INTER PARTES REEXAMINATION CERTIFICATE ISSUED UNDER 35 U.S.C. 316

NO AMENDMENTS HAVE BEEN MADE TO THE PATENT

AS A RESULT OF REEXAMINATION, IT HAS BEEN DETERMINED THAT:

The patentability of claims 1-17 is confirmed.

\* \* \* \* \*